(12) United States Patent
Bouchez et al.

(10) Patent No.: US 8,549,958 B2
(45) Date of Patent: Oct. 8, 2013

(54) AUTOMATIC BICYCLE PEDAL WITH FLEXIBLE REAR LEVER

(75) Inventors: Julien Bouchez, Marseilles (FR); Fabien Delangue, Varennes (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 13/236,909

(22) Filed: Sep. 20, 2011

(65) Prior Publication Data

US 2012/0067165 A1 Mar. 22, 2012

(30) Foreign Application Priority Data

Sep. 21, 2010 (FR) .................................. 10 57568

(51) Int. Cl.
*B62M 3/00* (2006.01)

(52) U.S. Cl.
USPC ........ 74/594.6; 74/594.4; 74/594.1; 74/594.7

(58) Field of Classification Search
USPC ........... 74/594.6, 594.4, 594.1, 594.7; 36/131
IPC ................................................ B62M 3/00,3/02
See application file for complete search history.

(56) References Cited

U.S. PATENT DOCUMENTS

| | | | | |
|---|---|---|---|---|
| 3,966,230 | A * | 6/1976 | Nicol | 280/281.1 |
| 4,947,708 | A * | 8/1990 | Lacombe | 74/594.6 |
| 5,105,683 | A * | 4/1992 | Mercat et al. | 74/594.6 |
| 5,381,708 | A * | 1/1995 | Liao | 74/594.6 |
| 5,442,976 | A * | 8/1995 | Cheng | 74/594.6 |
| 5,497,680 | A * | 3/1996 | Nagano | 74/594.6 |
| 6,035,743 | A * | 3/2000 | Gapinski et al. | 74/594.6 |
| 2004/0089098 | A1 * | 5/2004 | Plassiard et al. | 74/594.6 |
| 2004/0154433 | A1 * | 8/2004 | Muraoka | 74/594.6 |
| 2006/0081088 | A1 * | 4/2006 | Muraoka et al. | 74/594.6 |
| 2007/0137430 | A1 | 6/2007 | Chao et al. | |
| 2009/0031850 | A1 * | 2/2009 | Hillairet et al. | 74/594.6 |
| 2012/0132030 | A1 * | 5/2012 | Kamada | 74/594.6 |
| 2012/0192674 | A1 * | 8/2012 | Chen | 74/594.6 |

FOREIGN PATENT DOCUMENTS

DE 19518084 A1 11/1996
DE 202005019542 U1 2/2006

OTHER PUBLICATIONS

EPO Form 1503, EP, Apr. 6, 2011, French Search Report for FR 1057568.
Formulaire FR237, FR, Sep. 21, 2010, Written Opinion for FR 1057568.

* cited by examiner

*Primary Examiner* — Thomas R Hannon
*Assistant Examiner* — Kashif Mohammed
(74) *Attorney, Agent, or Firm* — Edwards Wildman Palmer LLP; Steven M. Jensen; Brian R. Landry

(57) ABSTRACT

This automatic bicycle pedal comprises a pedal body (2) equipped at a first end (5) with first attachment means (7) and at a second end (6) with second attachment means (10), an elastically deformable lever (8) bearing the second attachment means and capable of being deformed between a first position of holding a cleat fixed to the underside of a shoe between the first and second attachment means, and a deformed second position allowing the cleat to be attached and detached in respect of attachment and detachment movements. The deformable lever comprises at least one first deformable zone (12) that can be deformed during attachment and detachment movements and at least one second deformable zone (13) that can be deformed during one of the said attachment and detachment movements, the said first and second zones having different stiffnesses.

12 Claims, 4 Drawing Sheets

AUTOMATIC BICYCLE PEDAL WITH FLEXIBLE REAR LEVER

CROSS REFERENCE TO RELATED APPLICATION

This application claims the benefit of French application No. FR 1057568, filed Sep. 21, 2010, the entire disclosure of which is incorporated herein by this reference.

The invention relates in general to automatic pedals for bicycles.

Automatic pedals conventionally comprise a pedal body provided at the front and the rear with attachment means used to hold a cleat that is fixed to the sole of a shoe. Such pedals originally had a relatively high number of component parts. Thus, in addition to the pedal body, they would comprise a spindle assembly, for mounting it on a pedal crank, comprising a spindle, rings, rolling bearings, seals, etc. and on which the pedal body was mounted such that it could rotate, a rear lever articulated to the body about a pivot axis, and an elastic system for preloading the lever. For example, the elastic system could be produced from a metallic or elastomer spring, a blade working in bending or in buckling, etc.

As will be appreciated, it is advantageous to reduce the number of component parts in order to simplify pedals with a view to reducing the weight and cost of manufacture and to simplifying the logistics.

The applicant company has thus proposed omitting the tapped thread in the bore provided in the pedal body into which two fix the pedal spindle and the bearings supporting the spindle, all of which are relatively bulky and expensive to manufacture. On this matter, reference may be made to document EP-A-1 063 161 in which the elastic lever-preload system is formed of an elastically deformable curved blade combined with a clip-in means which, on assembly, is inserted along the axis of the bore for the pedal spindle in order to retain this spindle axially. Further, the lever comprises, in place of its pivot pin, a cylindrical rib which fits into a corresponding cylindrical groove in the body.

Further improvements have also been made to automatic pedals with a view in particular to improving the comfort of pedalling. One embodiment is described in document US 2007/137430 which proposes allowing relative movement of the cleat and of the pedal by a special shaping of the front part of the pedal.

Further improvements have also involved making the pedals universal so as to avoid the requisite use of special-purpose cleats. On this matter, reference may be made to document JP 3034987.

Mention will also be made of the solutions that involve improving the clipping of the foot into and out of the pedal, which means to say the attachment and detachment of the shoe in relation to the pedal. For example, document U.S. Pat. No. 5,105,683 describes an automatic pedal which affords substantial stiffness in a compact arrangement and in which the position of the lever can be defined precisely and its elasticity improved by making the lever and the elastic system as a single piece comprising an end pivot that collaborates with a corresponding bearing zone provided in the pedal body.

In the light of the foregoing, the object of the invention is to propose an improved automatic pedal for a bicycle which will further improve the clipping of the foot into and out of the pedal and in particular will allow the foot to be clipped in and out with different resistances.

The subject of the invention is therefore an automatic bicycle pedal, comprising a pedal body equipped at a first end with first attachment means and at a second end, the opposite end to the first end with second attachment means, an elastically deformable lever bearing the second attachment means and capable of being deformed between a first position in which a cleat fixed to the underside of a shoe is held between the first and second attachment means, and a deformed second position allowing the cleat to be attached and detached in respect of attachment and detachment movements.

According to one general feature of this pedal, the deformable lever comprises at least one first deformable zone that can be deformed during attachment and detachment movements and at least one second deformable zone that can be deformed during one of the attachment and detachment movements, the said first and second zones having different stiffnesses.

Thanks to the use of a lever that has deformable zones acting selectively upon attachment and detachment, and which have different stiffnesses, it is possible to provide for easier clipping of the foot into the pedal, while at the same time keeping the foot held firmly during riding without any unwanted unclipping from the pedal, particularly for beginner cyclists. It is also possible, conversely, to make clipping the foot into the pedal more difficult.

According to another feature of the automatic pedal, the lever comprises at least a first blade provided with an end hook comprising a transverse clip-in ramp that can be deformed during attachment, and a transverse end-stop intended to hold the cycle shoe vertically.

For example, the first blade further comprises at least one bearing surface oriented substantially laterally at an angle and intended to collaborate with a complementary bearing surface belonging to the cleat, at least when the foot is being clipped out of the pedal, in order to deform the middle blade.

The lever may further comprise at least a second blade provided with a second end hook comprising a bearing surface oriented substantially laterally at an angle and intended to collaborate with a complementary bearing surface belonging to the cleat in order to hold it laterally and against the backstop during detachment.

For example, the clip-in ramp of the first blade is of a longer length than the bearing surface of the second blade.

The bearing surface may extend at an angle of around 45° with respect to a longitudinal axis of the pedal.

Advantageously, the lever comprises a first blade and a second blade arranged on each side of the first blade, each second blade comprising a bearing surface oriented at an angle substantially laterally towards the outside of the pedal.

In one embodiment, the first and second blades are configured in such a way that the clip-in ramp of the first hook is offset from the bearing surface of the second hooks.

The said first and second deformable zones may be made of the same material and have different thicknesses in order to give them different stiffnesses.

For example, the said second zones have a relatively higher stiffness than the said first zones.

According to yet another feature, the first blade has a smaller thickness than the second blades, and a greater width than the said second blades.

In one embodiment, the pedal body is made entirely as a single piece.

For example, the pedal body may comprise, from the first end to towards the second end, a substantially flat first part, a bent-over second part with its convex face facing towards a cleat-accommodating zone, a bent-over third part with its concave face facing towards the said cleat-accommodating zone, and a fourth part that constitutes the said second attachment means.

In various embodiments, the said first and second zones may have a stiffness that can be adjusted in order to adjust the forces to clip the foot into and out of the pedal.

For this purpose, for example, the said first and second zones may be provided with stiffening inserts or be locally connected by flanges.

Other objects, features and advantages of the invention will become apparent from reading the following description, given solely by way of nonlimiting example, and made with reference to the attached drawings in which:

FIGS. 1 and 2 depict an automatic pedal according to the invention, denoted by the overall numerical reference 1, in a horizontal position corresponding to a position of normal use.

In the exemplary embodiment illustrated, the pedal comprises a body 2 produced as a one-piece component. This entity may be made of metal or of fibre-reinforced plastic, or alternatively of carbon fibre. However, any other material suited to the intended use may also be used. However, of course, it would not constitute a departure from the scope of the invention if the body 2 were produced in several component parts.

Figure 1:
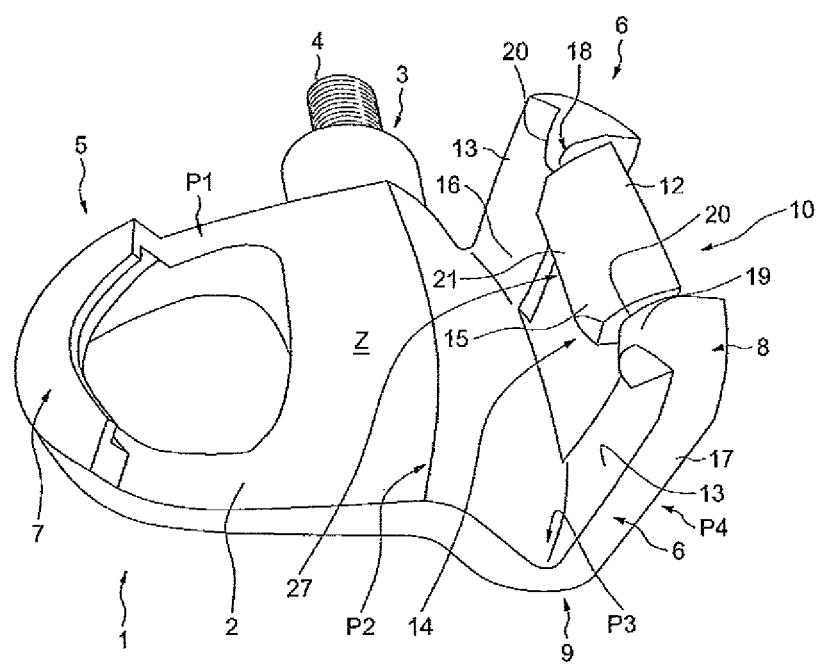
FIG. 1 is a perspective view of an automatic pedal according to the invention.

As may be seen, the body 2 comprises a transverse bore 3 used to mount a spindle 4 for attaching the pedal 1 to a pedal crank (FIG. 1).

The body 2 comprises a first end 5, which constitutes a front end, and a second end 6, which constitutes a rear end.

At the front, the body 2 comprises first attachment means 7 produced in the form of a fixed hook, and, at the rear, a lever 8 that can pivot about a horizontal and transverse axis 9 and which comprises second attachment means 10.

More specifically, the lever 8 works in bending and is configured to afford different resistances to clipping the foot into and out of the pedal, while at the same time during cycling holding the cleat effectively, both laterally and vertically.

As may be seen, the rear lever 8 is produced in at least two parts and thus comprises at least a first deformable zone 12 and at least one second deformable zone 13 which act in a special way when clipping the foot into and out of the pedal, and each of which bears an end hook.

In the exemplary embodiment depicted, the rear lever 8 comprises a first blade 14 standing up substantially vertically and which is provided at its free end with a hook 15 and two lateral blades 16 and 17 provided on each side of the first blade 14 and which likewise each bear an end hook 18 and 19 respectively.

The two lateral blades 16 and 17 also stand up substantially vertically. However, they have shorter hooks which means that the front end 20 of the lateral hooks 18 and 19 of the lateral blades is offset rearwards with respect to the front end 21 of the hook 15 of the middle blade 14. The shoe is clipped into the pedal in a foot-insertion movement downwards, the foot being clipped out of the pedal essentially by twisting the foot.

Thus, the first blade 14 is intended to be deformed when the foot is being clipped into and out of the pedal, whereas the lateral blades 16 and 17 are intended to be deformed more particularly when the foot is being clipped out of the pedal.

Figure 2:
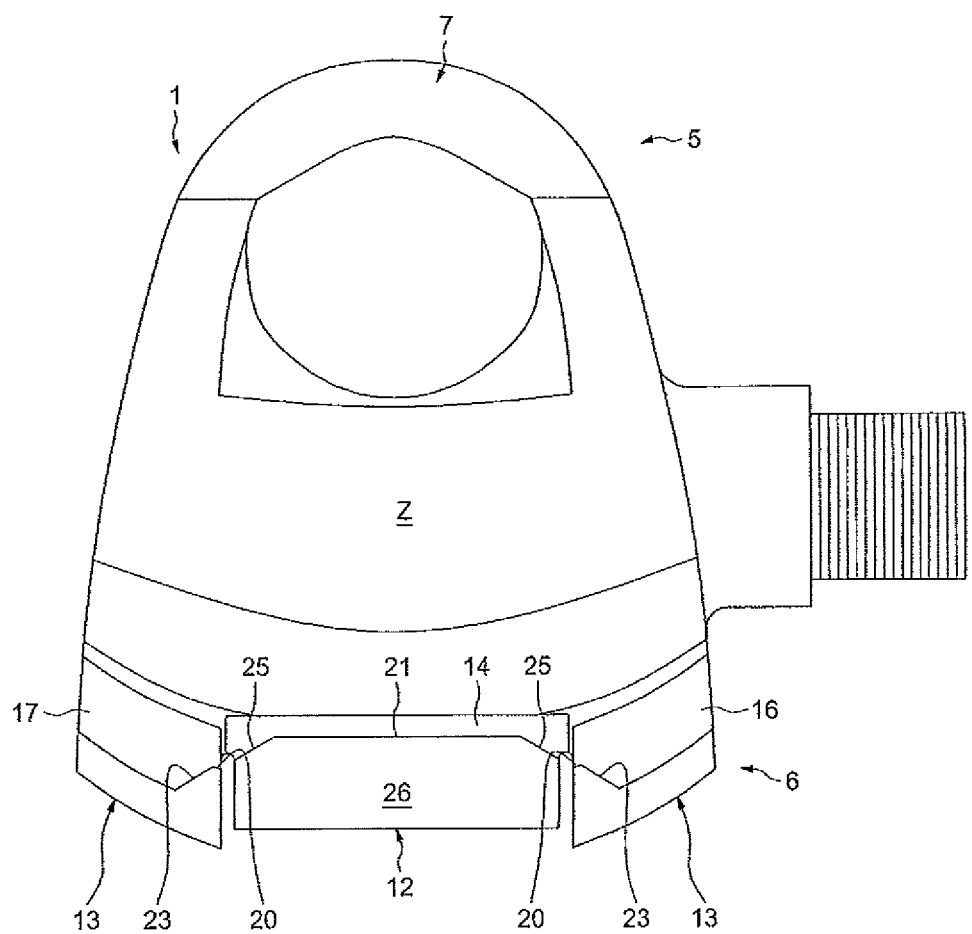
FIG. 2 is a plan view of the pedal of FIG. 1.
Figure 3:
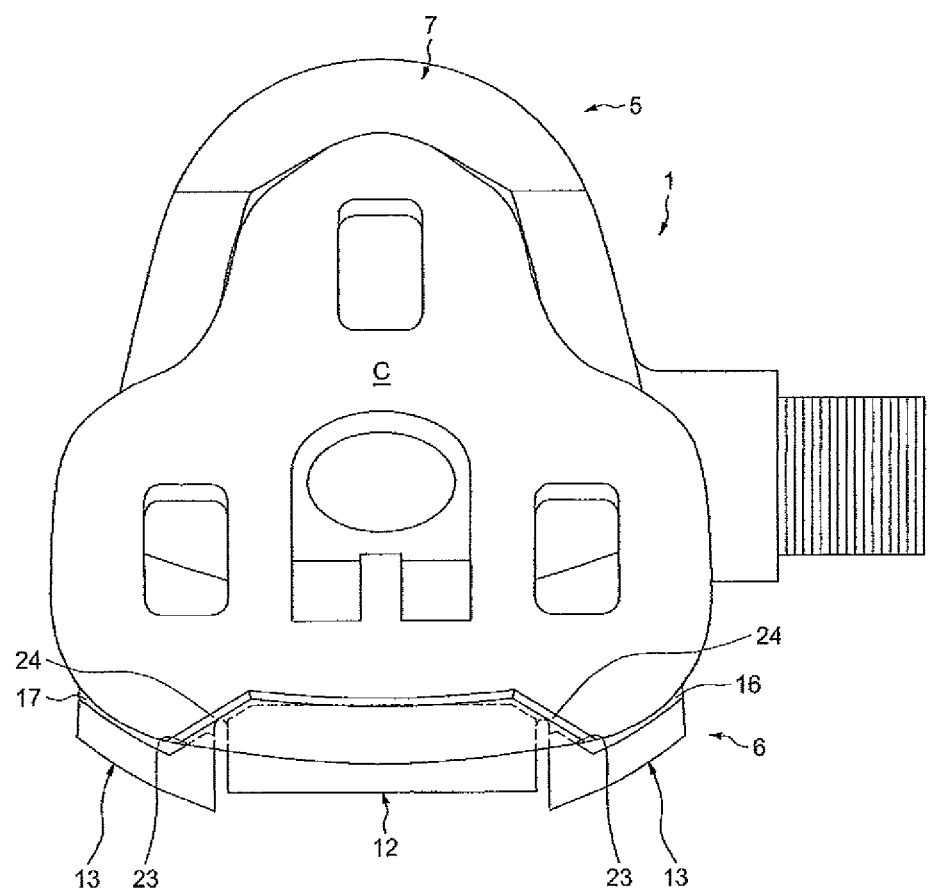
FIG. 3 shows the pedal of FIGS. 1 and 2 at the beginning of the clipping of the foot into the pedal.
Figure 4:
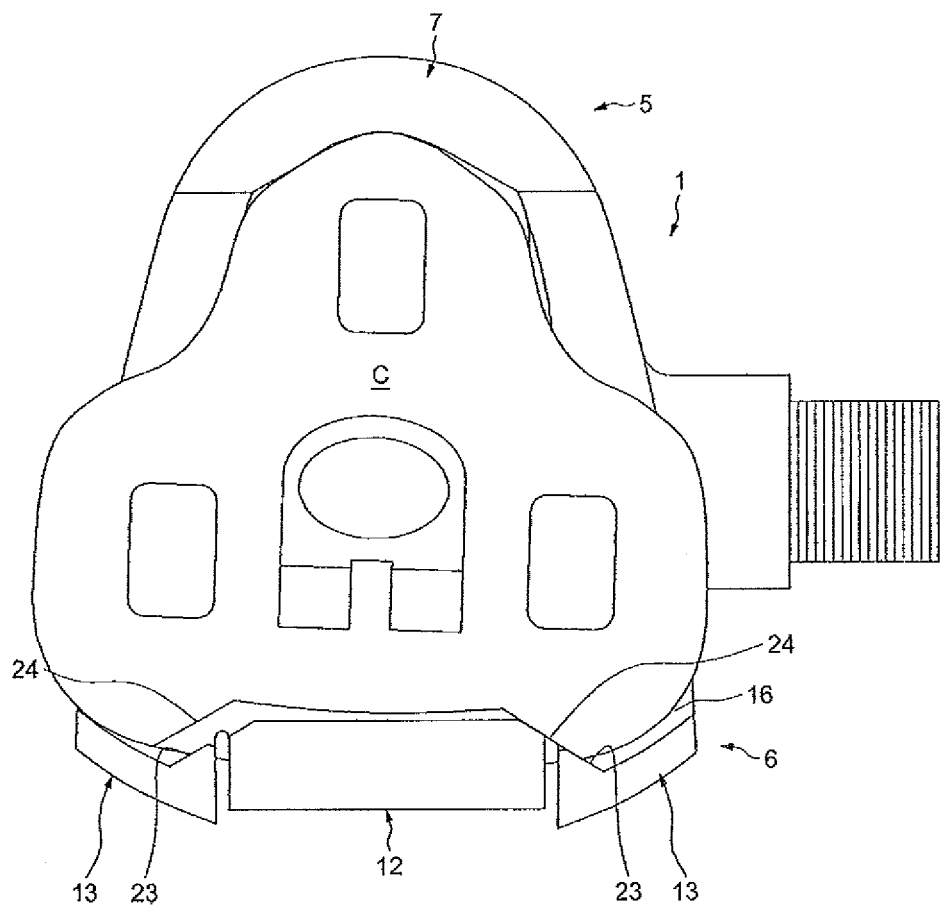
FIG. 4 illustrates the lateral holding of the cleat and the start of the phase of clipping the foot out of the pedal.

Referring more particularly to FIG. 2, it may be seen that the hooks 18 and 19 of the lateral blades are each provided with a bearing surface 23 extending at an angle from the front end 20 so that, for example, this bearing surface 23 makes an angle of around 45° with respect to an overall longitudinal axis of the pedal and so that these bearing surfaces extend at an angle substantially towards the outside of the pedal. These bearing surfaces are intended to collaborate with a complementary bearing surface 24 provided on a cycling shoe cleat C (FIGS. 3 and 4).

The middle blade 14 is also provided with such bearing surfaces 25 which extend on each side of the front end 21 at the hook 15. A single surface 25 just like a single lateral blade 16 or 17 could equally be provided, if the plan is for the foot to be unclipped from the pedal only in one direction of twisting of the foot. Like the bearing surfaces 23 of the lateral blades, these are positioned substantially vertically, being oriented at an angle towards the outside, on each side of the pedal.

Thanks to this arrangement, the middle blade 14, which has the longest hook, is first of all engaged as the cleat is being clipped into the pedal as the shoe is being clipped into the pedal. The hook 15 for this purpose comprises an upper clip-in ramp 26 oriented transversely downwards and forwards, which means to say towards a cleat-accommodating zone Z and against which there bears a corresponding surface provided on the cleat so as to deform the middle blade backwards during clipping-in.

The hook 15 further comprises a transverse end-stop 27 extending horizontally under the ramp 26. Thus, following clipping-in, the hook 15, together with the second hooks 18 and 19 of the stiffer lateral blades, holds the cleat vertically.

As far as the lateral blades are concerned, in addition to holding the cleat vertically, they also, on the one hand, provide rear retention of the cleat by forming a backstop and, on the other hand, hold the cycling shoe laterally via their bearing surface 23 which collaborates with the corresponding bearing surfaces 24 of the cleat.

With reference to FIGS. 3 and 4, this pedal is used, when clipping the foot into the pedal, after having inserted a protruding forward portion of the cleat into the first front attachment means 7, by clipping the cleat into the hook 15 of the middle blade 14 with a downwards movement. During this clipping-in movement, the cleat applies force to the upper ramp 26 of the middle hook 15 in such a way as to deform the middle blade 14 backwards. Because of the forward position of this hook, during this stage, the hooks borne by the lateral blades are not engaged.

During cycling, the cycling shoe is then held vertically by the middle blade and the end hook 15 that it bears and by the hooks 18 and 19 of the lateral blades. It is also held at the back by the stiffer lateral blades and is held laterally by the bearing surfaces 23 of the lateral blades which collaborate with the corresponding surfaces 24 of the cleat.

In order to clip the foot out of the pedal, a force has to be applied to these lateral bearing surfaces by twisting the foot. During the initial travel of this foot movement, the bearing surfaces 23 of the lateral blades are first of all engaged by the surfaces of the cleat, then, when the lateral blades 16 and 17 have deformed rearwards, the bearing surfaces 24 of the cleat deform the middle blade by pressing against the corresponding bearing surfaces 25 so as to retract this middle blade to the point that the cleat can be disengaged.

It is of course just as possible for the bearing surfaces 23 and 25 to be engaged one after the other if the corresponding surface of the cleat is suitably configured or if the plane of the surface 25 of the middle blade is offset rearwards with respect to the plane of the bearing surface 23, as it is for these bearing surfaces 23 and 25 to act simultaneously.

It will be noted that the lateral blades 16 and 17 are stiffer than the middle blade 14. Thus, the effort required for clipping the foot out of the pedal, particularly at the start of that travel, is greater than the effort required for clipping the foot into the pedal.

In the exemplary embodiment considered, in which the body 2 of the pedal is made as a single piece, this increased stiffness is obtained by providing lateral blades 16 and 17 of greater thickness. However, of course, if the pedal body is made as several component parts, it might be possible to plan for increased stiffness to be obtained by using materials with different stiffnesses.

However, as an alternative, it would also be possible to use any other means that allows the first and second zones 12 and 13 and, in particular, the blades 14, 16 and 17 to be given adjustable stiffnesses with a view to adjusting the forces required to clip the foot into and out of the pedal.

For example, longitudinal stiffening inserts could be provided to increase the thickness of the blades, or flanges could be used that locally hold the blades together at various points.

However, the embodiment in which the body is made as a single piece is advantageous in as much as it allows a reduction in manufacturing costs. As illustrated, the one-piece pedal can thus be produced from a single body comprising, starting from the first end 5, a first part P1 delimiting the bearing surface Z for the cleat, a bent-over second part P2 with its convex face facing towards the cleat-accommodating zone, extended by a bent-over third portion P3 delimiting the axis of articulation 9 for the rear lever and with its concave face facing towards the cleat-accommodating zone and, finally, towards the rear, a fourth portion P4 comprising the middle blade 14 and the two lateral blades 16 and 17 provided with their end hook.

In the exemplary embodiment that has just been described, the effort required to clip the foot into the pedal, which is lower than the effort required to clip the foot out of the pedal, is obtained by giving the rear lever a middle blade 14 of lower stiffness. It will be noted in this regard that the length of the clip-in ramp 26 of the hook 21 of the middle blade is such, and in particular, greater than the lateral surfaces 23 of the hooks of the lateral blades, that the lever moves a great distance when it opens to clip the foot into or out of the pedal, with also a low force required. By contrast, the length of the bearing surfaces 23 and 25 of the lateral and middle blades offers greater resistance and, as a result, when combined with the increased thickness of the latter blades 16 and 17, holds the cleat firmly in the lateral direction and against the backstop during pedalling, and affords greater resistance to clipping the foot out of the pedal.

It will also be noted that the width of the middle blade 14 is greater than that of each of the two lateral blades 16 and 17.

As an alternative, it would also be possible to increase the stiffness of the middle blade 14 so as to increase the resistance when clipping the foot into the pedal and, if appropriate, to reduce the stiffness of the lateral blades so as to reduce the resistance when clipping the foot out of the pedal, particularly at the start of travel.

What is claimed is:

1. An automatic bicycle pedal, comprising a pedal body equipped with:
    first attachment means at a first end,
    second attachment means at a second end opposite to the first end, and
    an elastically deformable lever bearing the second attachment means and capable of being deformed between a first position in which a cleat fixed to the underside of a shoe is held between the first and second attachment means and a deformed second position allowing the cleat to be attached and detached in respect of attachment and detachment movements, characterized in that:
    the deformable lever comprises:
        a first blade provided with an end hook comprising:
            a transverse clip-in ramp for deforming the first blade upon attachment, and
            a transverse end-stop intended to hold the shoe vertically,
        a lateral blade arranged on each side of the first blade, the first blade having a smaller thickness and a greater width than the lateral blades,
        at least one first deformable zone that can be deformed during attachment and detachment movements and
        at least one second deformable zone that can be deformed during one of the attachment and detachment movements, the first and second zones having different stiffnesses wherein the at least one second deformable zones have a relatively higher stiffness than the first deformable zones.

2. The pedal according to claim 1, characterized in that the first blade further comprises at least one bearing surface oriented substantially laterally at an angle and intended to collaborate with a complementary bearing surface belonging to the cleat, at least when the foot is being clipped out of the pedal, in order to deform the first blade.

3. The pedal according to claim 2, characterized in that the deformable lever comprises at least a second blade comprising a second end hook, the second end hook comprising a bearing surface oriented substantially laterally at an angle and intended to collaborate with a complementary bearing surface belonging to the cleat in order to hold the cleat laterally and against a backstop and during detachment.

4. The pedal according to claim 1, characterized in that the deformable lever comprises at least a second blade comprising a second end hook, the second end hook comprising a bearing surface oriented substantially laterally at an angle and intended to collaborate with a complementary bearing surface belonging to the cleat in order to hold the cleat laterally and against a backstop and during detachment.

5. The pedal according to claim 4, characterized in that the bearing surface of the second blade extends at an angle of around 45° with respect to a longitudinal axis of the pedal.

6. The pedal according to claim 4, characterized in that the transverse clip-in ramp of the first blade is of a longer length than the bearing surface of the second blade.

7. The pedal according to claim 6, characterized in that the bearing surface of the second blade extends at an angle of around 45° with respect to a longitudinal axis of the pedal.

8. The pedal according to claim 1, characterized in that each lateral blade includes a bearing surface oriented substantially laterally at an angle towards the outside of the pedal.

9. The pedal according to claim 1, characterized in that the first and second deformable zones are made of the same material and have different thicknesses in order to give them different stiffnesses.

10. The pedal according to claim 1, characterized in that the second deformable zones have a relatively higher stiffness than the first deformable zones.

11. The pedal according to claim 1, characterized in that the pedal body is made as a single piece.

12. The pedal according to claim 11, characterized in that the pedal body comprises, from the first end to towards the second end, a substantially flat first part, an angled second part with its convex face facing towards a cleat-accommodating zone, an angled third part with its concave face facing towards the cleat-accommodating zone, and a fourth part that constitutes the second attachment means.

* * * * *